(12) United States Patent
Kostkin

(10) Patent No.: US 12,543,721 B2
(45) Date of Patent: Feb. 10, 2026

(54) AGRICULTURAL SPRAYER

(71) Applicant: PEK AUTOMOTIVE D.O.O., Vrhnika (SI)

(72) Inventor: Mikhail Kostkin, Vrhnika (SI)

(73) Assignee: PEK AUTOMOTIVE D.O.O., Logatec (SI)

( * ) Notice: Subject to any disclaimer, the term of this patent is extended or adjusted under 35 U.S.C. 154(b) by 186 days.

(21) Appl. No.: 18/576,865

(22) PCT Filed: Jul. 30, 2021

(86) PCT No.: PCT/IB2021/000468
§ 371 (c)(1),
(2) Date: Jan. 5, 2024

(87) PCT Pub. No.: WO2023/007199
PCT Pub. Date: Feb. 2, 2023

(65) Prior Publication Data
US 2024/0306625 A1    Sep. 19, 2024

(51) Int. Cl.
*A01M 7/00* (2006.01)
(52) U.S. Cl.
CPC ........ *A01M 7/0014* (2013.01); *A01M 7/0082* (2013.01)
(58) Field of Classification Search
CPC ... A01M 7/0014; A01M 7/0082; A01G 13/06; A01G 13/065
USPC ........ 239/2.1, 14.1, 587.1, 587.5, 587.6, 77; 47/2
See application file for complete search history.

(56) References Cited

U.S. PATENT DOCUMENTS

| | | | | |
|---|---|---|---|---|
| 2,561,432 A | * | 7/1951 | Tranter | A01M 7/0014 239/77 |
| 4,823,268 A | * | 4/1989 | Giles | G01S 15/89 239/77 |
| 5,305,548 A | * | 4/1994 | Siebol | A01G 13/065 239/14.1 |
| 6,223,995 B1 | * | 5/2001 | Evans | A01G 15/00 239/77 |

(Continued)

FOREIGN PATENT DOCUMENTS

| | | |
|---|---|---|
| AU | 1634783 A | 1/1984 |
| CN | 2931204 Y | 8/2007 |

(Continued)

OTHER PUBLICATIONS

International Search Report from ISA/EPO, mailing date Apr. 8, 2022.

*Primary Examiner* — Steven J Ganey
(74) *Attorney, Agent, or Firm* — Patentbar International

(57) ABSTRACT

The agricultural sprayer includes a base with two vertical guides fixed thereon and carriages mounted on and capable of traveling along said guides. A ducted fan is turnably mounted on axles between the carriages. The inner surface of the fan duct is equipped with nozzles connected to a liquid container. One of the carriages consists of two parts: the first and the second one, with the second part capable of moving relative to the first one. The first and the second parts of said carriage have a duct-swinging crank-rocker mechanism mounted thereon. Said mechanism is configured for setting the inclination angle of the fan duct and adjusting its oscillation amplitude.

8 Claims, 4 Drawing Sheets

(56) References Cited

U.S. PATENT DOCUMENTS 6,257,498 B1 * 7/2001 Siebol ................ A01M 7/0014
239/77

FOREIGN PATENT DOCUMENTS

| EP | 0203116 A1 | 12/1986 |
|----|------------|---------|
| EP | 0951829 A1 | 10/1999 |
| KR | 20130106546 A | 9/2013 |
| KR | 20160051268 A | 5/2016 |
| WO | 2017065412 A1 | 4/2017 |

* cited by examiner

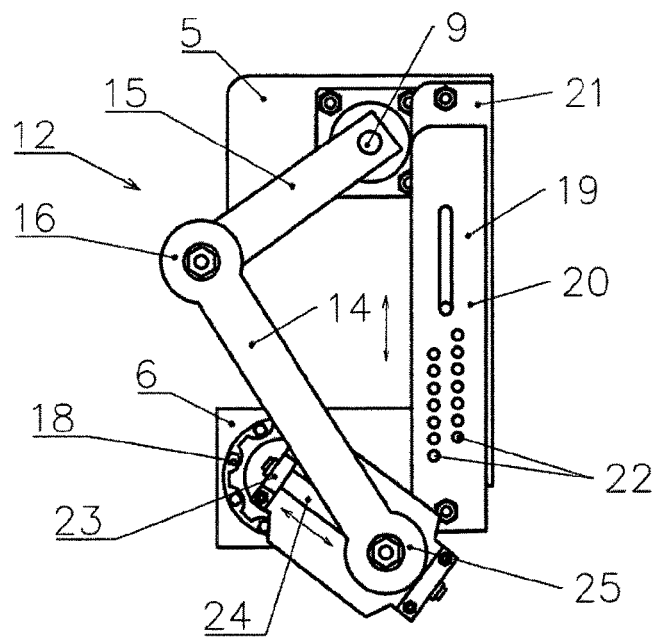
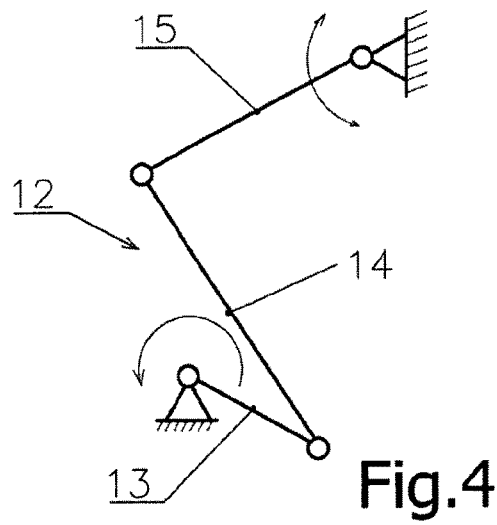
Fig.3  Fig.4
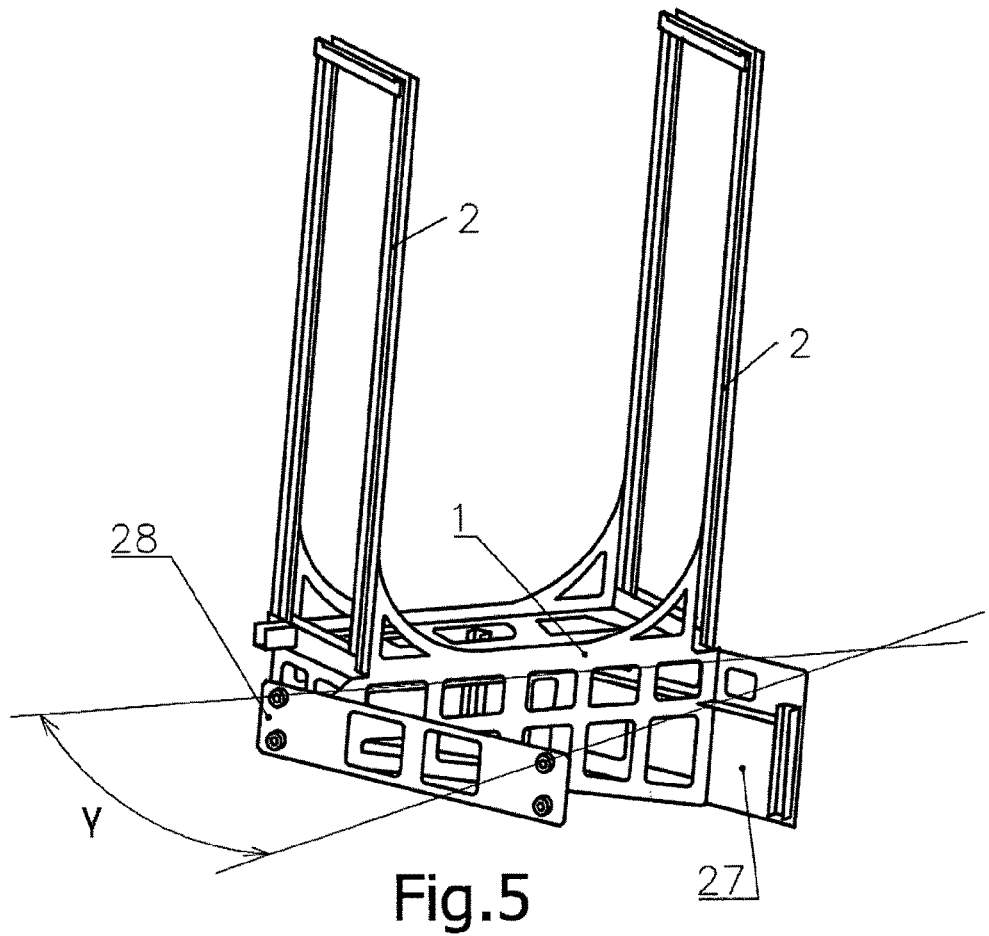
Fig.5

AGRICULTURAL SPRAYER

RELATED APPLICATIONS

This application is a U.S. National Stage Application of International Patent Application PCT/IB2021/000468 filed on Jul. 30, 2021 which is incorporated herein by reference in its entirety.

FIELD OF THE INVENTION

The invention relates to agricultural machinery and can be applied, specifically, in horticulture.

BACKGROUND OF THE INVENTION

Agricultural sprayer designs that use ducted fans are known.

Specifically, Patent KR20160051268, publication date 2016 Aug. 23, ICL A01M-007/00, describes the design of a device for spraying liquid chemicals in both vertical and horizontal directions. The device contains a ducted fan capable of changing its position under the action of a vertically rotating drive and a horizontally rotating drive.

Patent EP-951829, publication date 1999 Oct. 27, ICL A01M-007/00, also describes a device for agricultural spraying consisting of a ducted fan and a plurality of external nozzles for spraying a phytosanitary liquid carried in an external liquid container. The device is equipped with an electrically-driven connecting rod that makes the duct oscillate in horizontal plane.

The design of the agricultural sprayer described in Patent EP-203116, publication date 1986 Dec. 3, ICL A01-007/00 is the closest analog to this invention. The agricultural sprayer contains a ducted fan with nozzles mounted thereon. The fan duct is hinge-mounted. To make the ducted fan oscillate, an actuator, specifically a hydraulic one, is used, which turns a driving plate with a coupling piece eccentrically mounted thereon.

SUMMARY OF THE INVENTION

The technical result delivered by the proposed invention consists of an enhanced spraying efficiency achieved by creating a powerful stream of an air-liquid mixture and targeting it at treated plantations with due regard to the type, height and density of the latter.

The agricultural sprayer includes a base with two vertical guides fixed thereon and carriages mounted on said guides and capable of traveling along the latter. A ducted fan is turnably mounted between the carriages on axles that are integral to said carriages. The inner surface of the fan duct is equipped with nozzles connected to a liquid container via pump. One of the carriages consists of two parts: the first part and the second part, with the second part being capable of moving relative to the first one. The first and second parts of said carriage support a crank-rocker mechanism that makes the fan duct oscillate, said mechanism being also configured for setting the inclination angle of the fan duct and adjusting the oscillation amplitude of said duct.

More particularly, a lifting device coupled with a corresponding carriage is installed on each vertical guide.

Furthermore, the duct-swinging crank-rocker mechanism contains a crank, a connecting rod and a rocker arm inter-hinged in series and capable of turning relative to each other. Also, the rocker arm is rigidly attached to the fan duct oscillation axle installed on the first part of the carriage, while the crank is attached to the axis of an electric motor mounted on the second part of the same carriage.

Moreover, the use of a mechanism that enables the second part of the carriage to pull some distance away from the first part of the carriage with subsequent locking of said second part of the carriage in its new position makes the setting of the duct inclination angle possible.

Additionally, the availability of a mechanism containing a crank that allows its joint with the connecting rod to travel along the crank length, makes the adjustment of the fan duct oscillation amplitude possible.

More particularly, the vertical guides are installed on the base at an angle to the vertical plane passing through the horizontal axis of the base.

BRIEF DESCRIPTION OF THE DRAWINGS

FIG. 3 shows the design of the crank-rocker mechanism with devices for setting the inclination angle and adjusting the oscillation amplitude of the duct.

FIG. 4 shows the kinematic diagram of the crank-rocker mechanism.

FIG. 5 shows the design of the base and guides.

DETAILED DESCRIPTION OF THE PREFERRED EMBODIMENTS

Embodiments of the Invention

Figure 1:
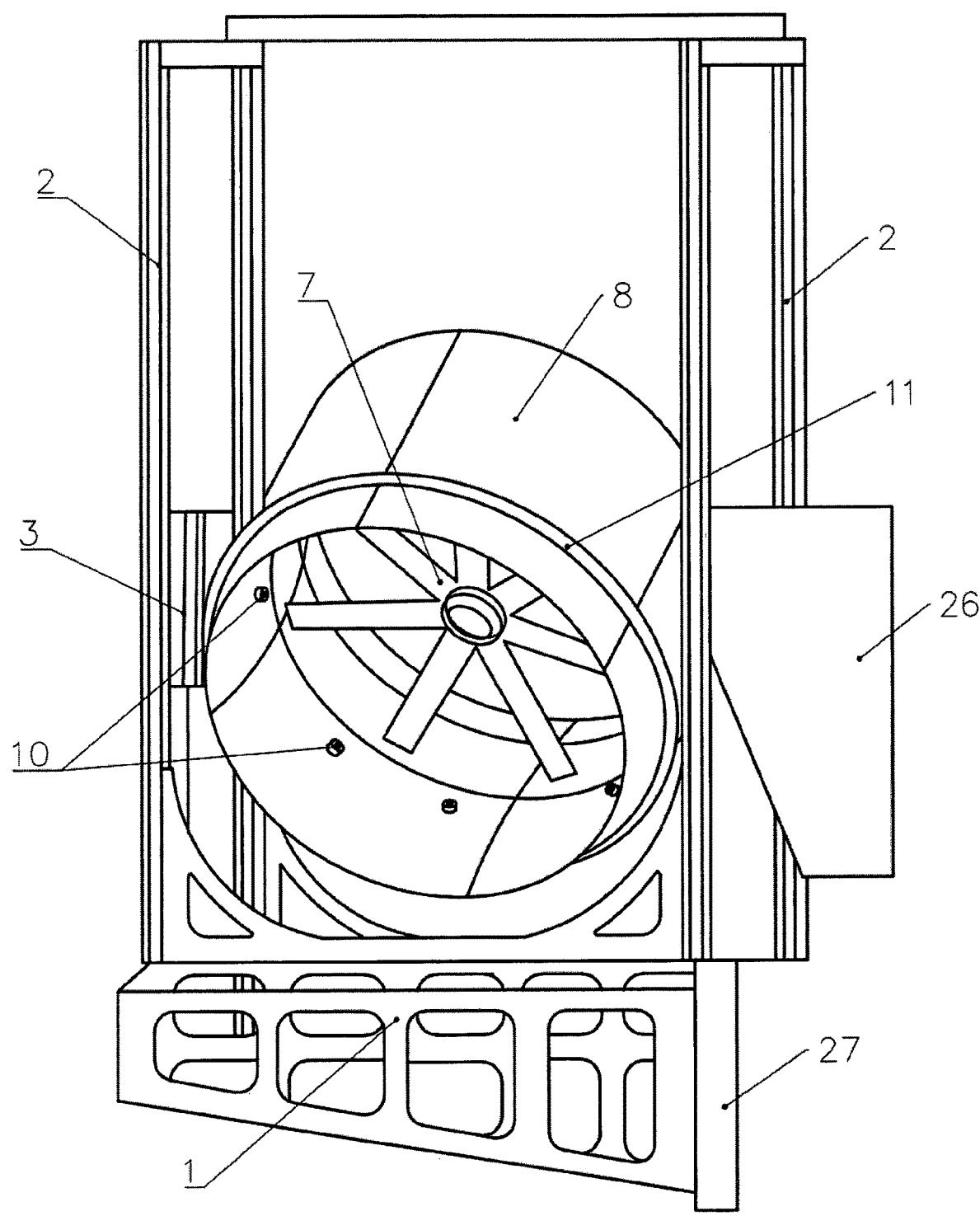
FIG. 1 shows a general view of the agricultural sprayer.

An agricultural sprayer of the proposed design can be used as a vehicle-towed attachment, vehicle-mounted unit or a self-propelled agricultural mechanism.

In the proposed embodiment, the agricultural sprayer includes (FIG. 1-FIG. 5) a base 1 with two vertical guides 2 attached, each of which has carriages 4 mounted thereon and capable of traveling along said guides. The carriages 4 are set in motion by lifting devices 3. In this example, the lifting devices 3 are electrically driven. The carriages 4 can travel up and down the vertical guides 2 being driven by the lifting devices 3, which can be operated by any actuating source, for example, a hydraulic one. Up- and down-travel is exercised along rolling or sliding support elements (not shown in the Figures). A fan 7 with a duct 8 is mounted between the carriages 4 on axles 9 located on said carriages 4 The duct 8 turns on the axles 9 using bearing assemblies (not shown in the Figures). The inner surface of the duct 8 carries nozzles 10 connected by means of a hose 11 via pump to a liquid container (not shown in the Figures).

Figure 2:
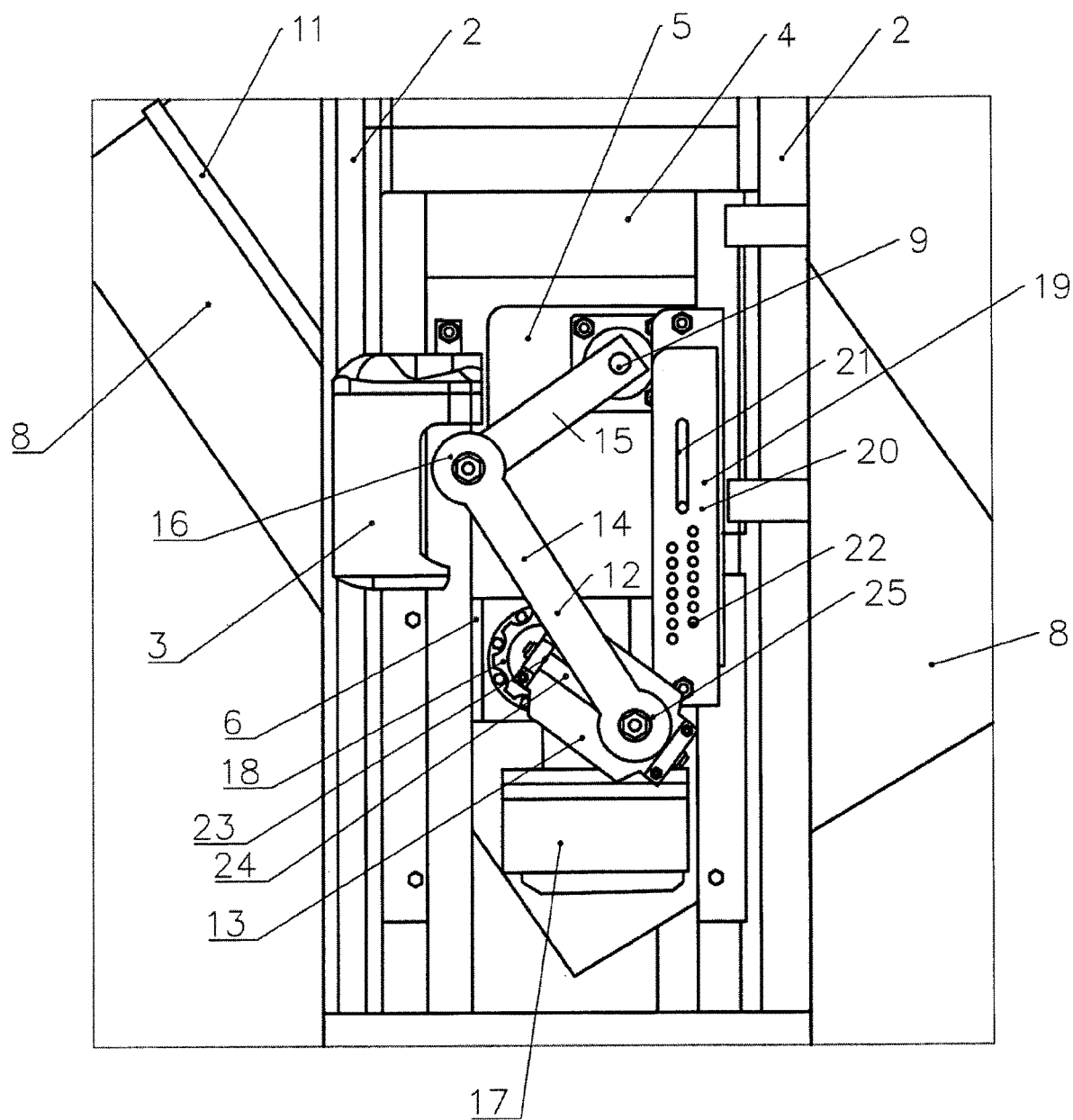
FIG. 2 shows a side view of the sprayer with the mechanisms for turning and swinging the fan duct.

One of the carriages 4 bears a crank-rocker mechanism 12 that makes the duct 8 oscillate. In FIG. 1, the crank-rocker mechanism 12 is mounted on the right-hand carriage 4 and is enclosed in a casing 26. FIG. 2 shows the crank-rocker mechanism 12 attached to a sprayer side, while in FIG. 3 it is shown as a separate structural element. The crank-rocker mechanism 12 for swinging the duct 8 is mounted on one of the carriages consisting of the first part 5 and the second part 6 of the carriage 4 (FIG. 2 and FIG. 3). Here, the second part 6 of said carriage 4 is designed to allow its travel relative to the first part 5 along the guide 2.

The crank-rocker mechanism 12 for swinging the duct 8 contains a crank 13, a connecting rod 14 and a rocker arm 15 interconnected in series by joints 16. The crank 13 is attached through a gear 18 to the axle of an electric motor 17 mounted on the lower part 6 of the carriage 4, while the rocker arm 15 is rigidly attached to the pivot axle 9 of the duct 8 installed in the upper part 5 of the same carriage 4. The kinematic diagram of the operation of the duct-swinging crank-rocker mechanism 12 is shown in FIG. 4.

The first part 5 and the second part 6 of the same carriage 4 are coupled by means of an assembly 19 designed for setting the inclination angle of the duct 8 relative to the horizontal plane. The setting is performed by splitting up the elements of the duct-swinging crank-rocker mechanism 12 between the two parts of the carriage 4: the first part 5 and the second part 6. The assembly 19 contains a strip 20 connecting the first part 5 with the second part 6 of the same carriage 4. Also, the assembly 19 has a runner slide 21, along which the strip 20 travels. The elements of the assembly 19 make it possible to puli the second part 6 of the carriage 4 apart from the first part 5 of the same carriage 4 by a preset distance and fix said parts of the carriage 4 in the new position by means of a lock 22. The second part 6 of the carriage 4 can be displaced against its first part 5 by different types of actuators, for example, by lever and hydraulic mechanisms.

The duct-swinging crank-rocker mechanism 12 also contains a mechanism 23 for adjusting the duct oscillation amplitude, which is designed, for example, as a screw 24 on the crank 13, along which a nut 25, carrying the pivot joint between the crank 13 and the connecting rod 14, travels. This arrangement makes the travel of the pivot joint along the length of the crank 13 possible. The closer the pivot joint between the crank 13 and the connecting rod 14 is to the axle of a gear 18, the smaller the oscillation amplitude is. Accordingly, the farther the joint, the greater the amplitude. The oscillation amplitude of the duct 8 can also be adjusted by other types of transfer mechanisms, for example, by rack-and-pinion or hydraulic actuators.

Also, the inclination angle and oscillation amplitude of the duct 8 can be set by means of automatic control systems.

FIG. 5 shows the embodiment of the agricultural sprayer in the form of a vehicle attachment. In this case, the base 1 has a mounting frame 27 connected to one of its sides, and a bearing frame 28 connected to its other side; the latter may carry signaling and/or safety devices. The same FIG. 5 shows an embodiment of the sprayer, in which the vertical guides 2 are installed on the base 1 at an angle g relative to the axis of the base 1. Such inclination of the guides 2, with the fan 7 and duct 8 carried between them (FIG. 1, FIG. 5), makes the penetration of liquid stream between treated plantation rows more efficient.

The agricultural sprayer operates as follows.

Figure 6:
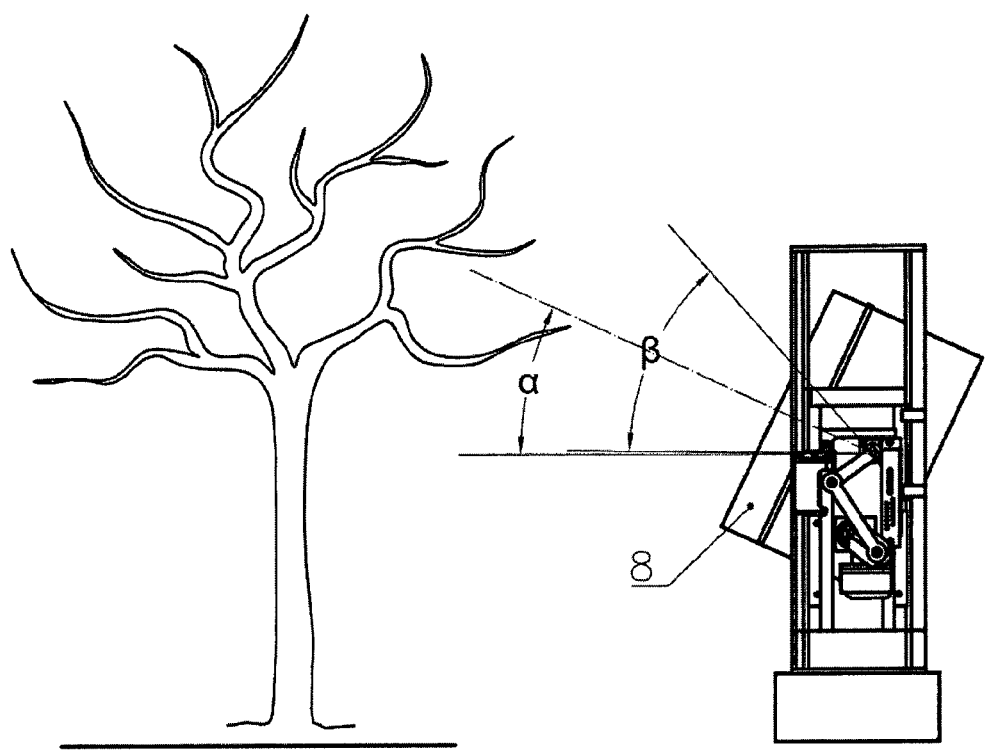
FIG. 6 shows an example of sprayer application for treating trees.
Figure 7:
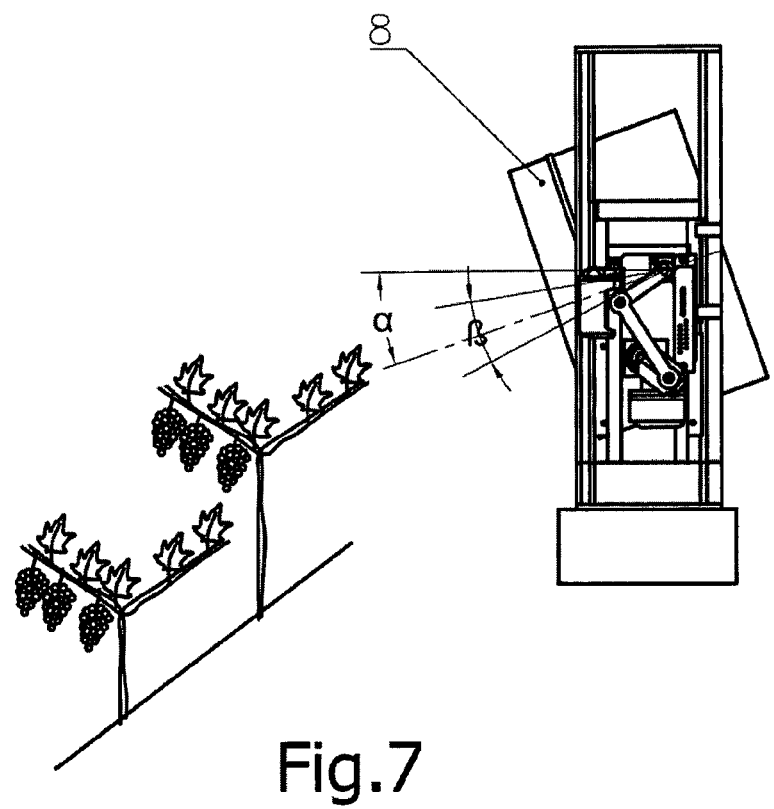
FIG. 7 shows an example of sprayer application for treating vineyards.

Depending on the type of treated agricultural plants and the angle of slope where those plants are cultivated, the fan 7 in the duct 8 travels along the vertical guides 2 driven by the lifting devices 3 to the preset height (FIG. 1). Also, depending on the previously specified plant parameters, angle a of duct inclination relative to the horizontal plane and angle b of duct oscillation are set to provide the spraying of the entire plant (FIG. 6-FIG. 7). FIG. 6 shows an example of how the duct operates at spraying garden trees, and FIG. 7—at spraying vineyards cultivated on a slope.

When the garden sprayer travels along a plantation row, the treating liquid is fed by means of a pump from the container to the nozzles 10 through the hose 11. The fan 7 and the duct 8 generate a powerful air-liquid stream. The mechanism that makes the duct 8 oscillate, directs the stream within the duct oscillation angle b at an inclination angle a. All the above-mentioned angles covered by the duct-swinging crank-rocker mechanism 12 can be set in advance or, if an automated system of swinging mechanism control is used, can be adjusted during the operation by sending appropriate commands or applying a preset agricultural sprayer operation program.

INDUSTRIAL APPLICABILITY

The proposed agricultural sprayer can be used for treating orchards, vineyards and other plantations.

The invention claimed is:

1. An agricultural sprayer, comprising a base with two vertical guides fixed thereon and carriages mounted on and capable of traveling along said guides, with a ducted fan installed between said carriages on turnable axles integral to the carriages, while the inner surface of the fan duct is equipped with nozzles connected via pump to a liquid container, wherein one of the carriages is made of two parts: the first part and the second part, said second part being capable of moving relative to the first part of the carriage, with said first and second parts carrying a duct-swinging crank-rocker mechanism comprising a crank, a connecting rod and a rocker arm interhinged in series and capable of turning relative to each other, with the rocker am rapidly attached to the duct swinging axle on the first part of the carriage, and the crank fastened to the axle of a motor installed on the second part of the same carriage, the duct-swinging crank-rocker mechanism also being configured for setting the duct inclination angle and adjusting the duct oscillation amplitude.

2. The agricultural sprayer according to claim 1, wherein a lifting device coupled with a corresponding carriage is mounted on each vertical guide.

3. The agricultural sprayer according to claim 1, wherein the possibility of setting an inclination angle of the duct is provided by a mechanism that enables the second part of the carriage to pull some distance away from the first part of said carriage and subsequently locks the second part of the carnage in its new position.

4. The agricultural sprayer according to claim 1, wherein a mechanism consisting of a crank that allows its joint with the connecting rod to travel along the crank length provides the possibility of adjusting the oscillation amplitude of the duct.

5. The agricultural sprayer according to claim 1, wherein the vertical guides are installed on the base at an angle to the vertical plane intersecting the horizontal axis of the base.

6. The agricultural sprayer according to claim 1, wherein the motor is an electrical motor.

7. The agricultural sprayer according to claim 6, wherein the possibility of setting an inclination angle of the duct is provided by a mechanism that enables the second part of the carriage to pull some distance away from the first part of said carriage and subsequently locks the second part of the carnage in its new position.

8. The agricultural sprayer according to claim 6, wherein a mechanism consisting of a crank that allows its joint with the connecting rod to travel along the crank length provides the possibility of adjusting the oscillation amplitude of the duct.

* * * * *